Figure 1:
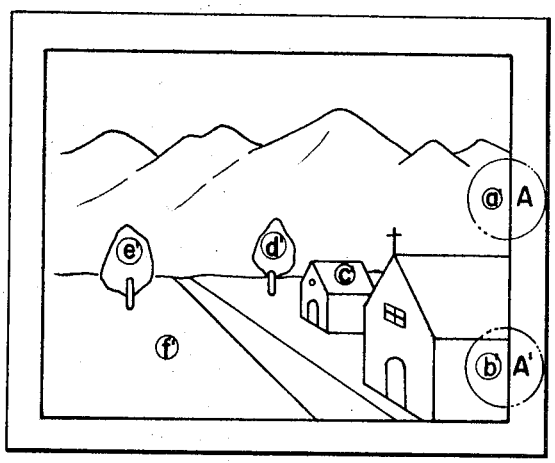

United States Patent

[11] 3,582,961

| [72] | Inventor | Chushiro Shindo<br>No. 14—12 1-Chome, Kinski Sumida-ku,<br>Tokyo, Japan |
|---|---|---|
| [21] | Appl. No. | 717,107 |
| [22] | Filed | Mar. 29, 1968 |
| [45] | Patented | June 1, 1971 |
| [32] | Priority | May 1, 1967 |
| [33] | | Japan |
| [31] | | 42/27562 |

[54] SYSTEM FOR DISPLAYING A TWO-DIMENSIONAL PHOTOGRAPHIC PICTURE IN THREE DIMENSIONS
20 Claims, 28 Drawing Figs.

[52] U.S. Cl................................................ 178/6.5, 350/131
[51] Int. Cl.............................................. H04n 5/72, G02b 5/00

[50] Field of Search............................................ 350/131, 144; 178/6.5

[56] References Cited
UNITED STATES PATENTS
2,891,440  6/1959  Barake ........................ 350/144
3,101,644  8/1963  Lopez-Henriquez ......... 350/144

*Primary Examiner*—Richard Murray
*Assistant Examiner*—Barry Leibowitz
*Attorney*—Sughrue, Rothwell, Mion, Zinn and MacPeak ABSTRACT: Displaying a two-dimensional photographic picture or portrait as if it is a three-dimensional one consisting of a front pattern, a back pattern and a photographic picture such as a photograph, a picture, printed matter or a photographic portrait by projecting the same on a screen such as a cinema screen television, or the like, wherein the front pattern and said back pattern are optically spaced from each other on a photographic picture or said screen to form a projected optical illusion image of said end area.

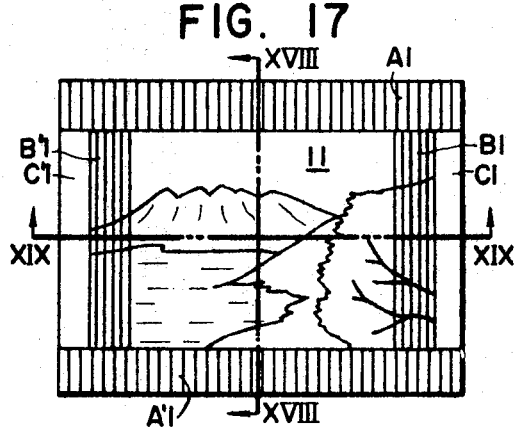
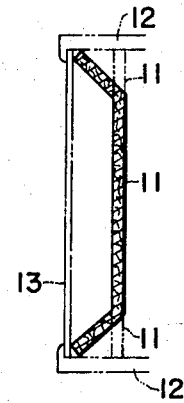
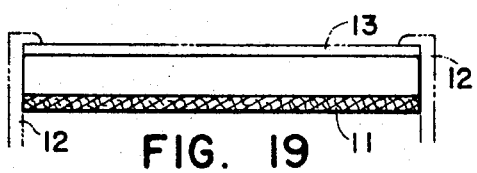
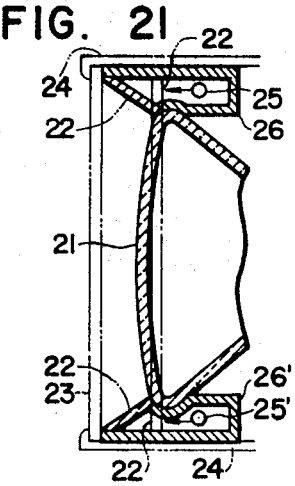
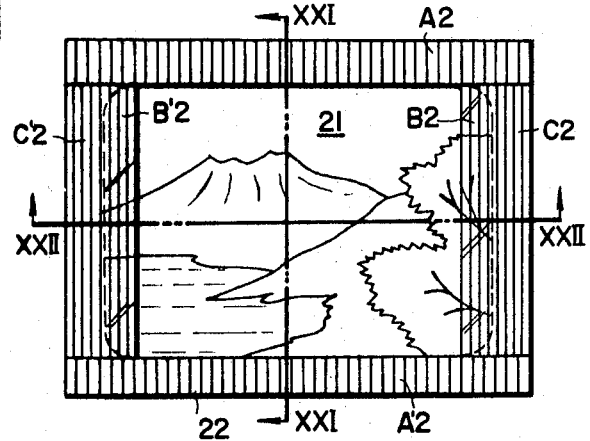
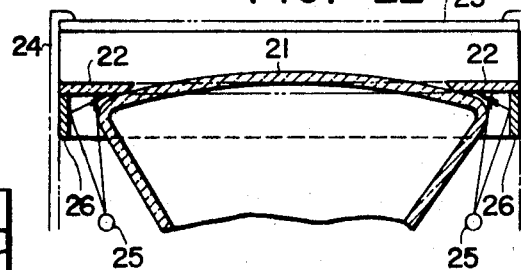
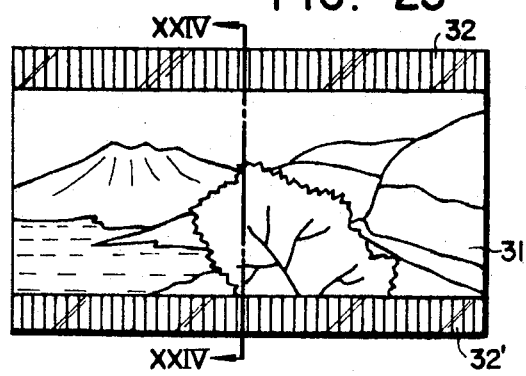

SYSTEM FOR DISPLAYING A TWO-DIMENSIONAL PHOTOGRAPHIC PICTURE IN THREE DIMENSIONS

This invention relates to a device for displaying a two-dimensional photographic picture or portrait as if it is a three-dimensional one by using a front pattern and a back pattern selected from the group consisting of flat patterns, blindlike or netlike patterns and wavelike patterns.

Heretofore, there have been proposed devices using a stereoscope or devices using a lenticular lens for displaying a two-dimensional picture as if it is a three-dimensional one due to optical illusion. The device using the stereoscope has the defect that the observation cannot easily be carried out. Also, the device using the lenticular lens has the defect that the picture cannot be observed clearly. Further, these devices cannot be used for displaying a moving picture such as a cinema picture, a television picture or the like, in a three-dimension.

In this invention used with moving pictures, the stereoscope is not used, but a front pattern and a back pattern are used in combination with a photographic picture or a portrait which is projected onto a screen.

Therefore, the principal object of this invention is to provide a device for displaying a two-dimensional photographic picture or portrait as if it is a three-dimensional one by using in combination of a front pattern and a back pattern selected from the group consisting of flat patterns which are provided with a plurality of vertical or oblique line stripes, blindlike or netlike patterns having a plurality of vertical or oblique hole stripes and wavelike patterns having a plurality of wave stripes.

It should be noted that the term "photographic picture" used herein includes a two-dimensional picture such as a photograph, a picture, printed matter, a copy or an animation picture or the like. Also, it should be noted that the term "photographic portrait" used herein includes a picture which is projected on a screen such as a cinema screen, a slide screen or an eidophor or a picture which is displayed by using electroluminescent phenomenon such as a telepicture or by using an electrosemiconductor.

When one sees the landscape at an interval of more than 10 m., the image does not have parallax. But one recognizes the landscape as a three-dimensional one. This fact shows that one's 3-D feeling can be established although there is no parallax between one's right and left eyes. By the above reason, one ought to feel the 3-D illusion in a perspective photographic picture which provides reasonable nonparallax. But, in practice, one cannot achieve a 3-D feeling in the picture. This results from the fact that the landscape has no end edges but the picture has clear end edges.

It is the meaning of three-dimensional feeling of a picture that one comes to recognize various levels in said picture indicated and comes to feel the peculiar distance of each article indicated in said picture respectively. When one sees a planetarium one receives the impression of a real night sky, but cannot recognize the distance of the screen forming the inside surface of the dome, in other words, one can see it three-dimensionally, because the screen of said planetarium is as if it had no end edge.

Cinerama was tried in 3-D movie systems by making its screen very wide to eliminate its edge-image. But yet, the end edges exist in practice, therefore, its 3-D effect is insufficient. Further, a pictorial device as wide as Cinerama is too abnormal to be used for general pictorial use. In this invention, while permitting the existence of the end edge of a picture, the effect of the end edge is eliminated and is thus applicable to a three-dimensional viewing system, therefore, this invention can be applied to pictorial devices which are ordinarily small.

The end edge effect of a picture is as follows. One will find a wonderful 3-D feeling when one sees a Cinema-Scope picture under conditions where its upper and lower edges are covered by one's arms. Needless to say, the reason is that the edge effect of the picture on the screen is eliminated by both arms which cover the picture's edge. This invention is a device producing the same effect by utilizing optical illusion.

The inventor has found that a two-dimensional picture or portrait can be seen as if it is a three-dimensional one if a circumferential or peripheral end area or portion can be optically eliminated from the photographic picture or portrait by using an optical illusion phenomenon.

The fundamental principle of this invention is based on the optical elimination of the circumferential end area of the photographic picture or portrait by using the optical illusion phenomenon induced by the action of a striped pattern having a plurality of vertical or oblique line stripes or discontinuous stripes or wave stripes (as hole stripes).

The principle of this invention is illustrated hereinafter by referring to the accompanying drawings 1 to 16. It should be understood that the meaning of the term "circumferential end area or portion" is an area which does not contain the photographic picture or portrait which is projected on the screen and the area is defined by the boundary line at the ends of the picture or the portrait, and therefore such a circumferential or peripheral end area can be found on a photograph, printed matter, a cinema screen, a t television receiver or the like.

Referring to FIGS. 1, 2, 3, 4, and 5, they illustrate the action and effect of the circumferential end area, A or A' of the two-dimensional pictures. Each of FIGS. 1, 2, 3, 4 and 5 shows only a painted picture having the circumferential white area on the surface of a single paper. If you look at the picture as indicated in FIG. 1, you see not only the mountain $a'$, the houses $b'$ and $c'$, the trees $d'$ and $e'$, and the ground $f'$, but also the end area A and the end area A'.

A part $a'$ of a mountain and a point A have the same binocular parallax and therefore they are considered to be in the same visual distance. Hereinafter, the included angle between the seeing lines of the right eye and the left eye is referred to "binocular parallax." In the same manner, part $b'$ of the house and a point A' have the same binocular parallax and therefore they are considered to be in the same visual distance, and by the way, the end areas (A) and (A') do not contain any picture painted perspectively, and thus, of course, you get the impression that the end areas (A) and (A') are located at equal visual distances. Consequently, you feel as if the mountain $a'$ and the house $b'$ are located at the same visual distance but you do not feel the depth of the space between the mountain $a'$ and the house $b'$. Thus, you can see the house $c'$, the trees $d'$ and $e'$ and the ground $f'$ as if they have no depth in the viewing direction because, as above mentioned, you feel that the space between them, namely the depth of the space between the mountain $a'$ and the house $b'$ is nothing. And consequently it will be understood that you feel as if they are located at the same level in which the mountain $a'$ and the house $b'$ are located. As mentioned, the "optical effect of the end area of the photographic picture" constrains you to feel that everything in the picture has no depth and are all located at the same plane-level. You cannot recognize the picture in 3-D, even if said picture was painted in perspective in a lifelike manner and although originally the picture can be seen in 3-D if said picture has no end boundary or edges thereof. This is illustrated as the action and effect of the circumferential or peripheral end area or portion of the picture, and you cannot look at a general picture as a three-dimensional picture, although said picture was painted perspectively in a lifelike manner.

Figure 2:
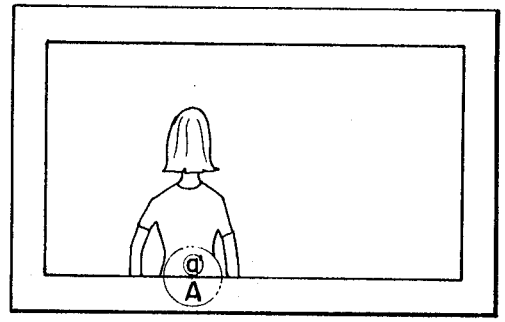
Figure 3:
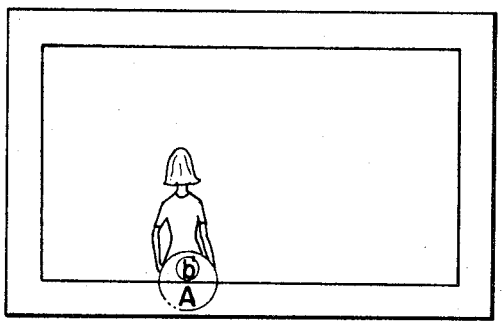

Such an action and effect of the circumferential end area is also illustrated in the same manner as in FIG. 1 by referring to the moving photographic pictures of FIGS. 2 and 3. When the picture as shown in FIG. 2 is moved and changed into the picture as shown in FIG. 3, in this case, the same angle of binocular parallax also establishes the following equations:

Person $a'$=edge A
Person $b'$=edge A
∴ $a'=b'$

This relation produces no feeling of depth between the person $a'$ in scene FIG. 2 and the person $b'$ in scene FIG. 3. This means that the girl in question only became smaller in size and not that she walked backwards. FIG. 2 and FIG. 3, therefore, are not three-dimensional, but only a flat moving picture.

Figure 4:
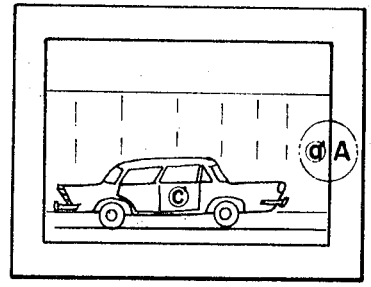
Figure 5:
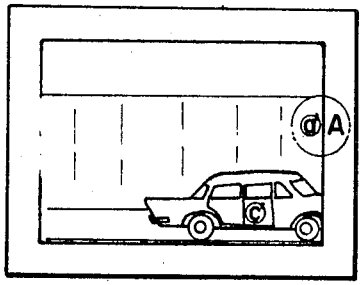

Also, FIGS. 4 and 5 illustrated in the same manner as in FIG. 2 and FIG. 3. When the motor car $c'$ as shown in FIG. 4 moves as shown in FIG. 5, also, fence $a'$ edge A $\therefore (a')-A=0$ This means that no depth is felt between $a'$ and A and the motor car $c'$ disappears since there is no space available. Contrary, when the motor car $c'$ emerges from the right side, it looks as though the car appeared from a limitlessly small space, with the result that it is seen as an extremely small shape. Such a thin-shaped motor car cannot stand at all. Accordingly, this picture as a whole is seen flatly and not in 3-D as stated above, and edge effect extends to the center of a picture and obstructs 3-D vision, as above.

Figure 6:
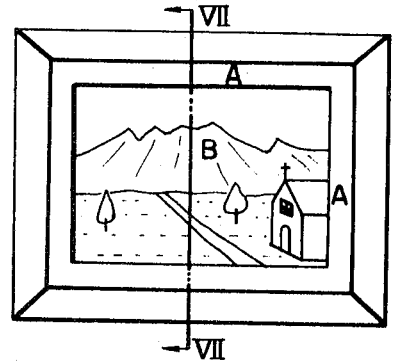
Figure 7:
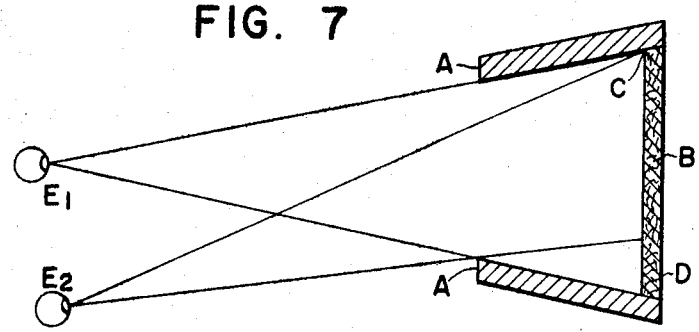

In order to eliminate the above mentioned actions and effects induced by the circumferential end area, the prior art uses a circumferential frame which is projected from the surface of the picture B as shown in FIGS. 6 and 7. In this case, the frame A and picture B cannot be viewed as if they are located at the same visual distance because the frame A is projected above the surface of the picture B and therefore the visual relationship between the end area A and the picture $a'$ as shown in FIGS. 1 to 5 is not maintained, therefore, in this case, end edge effect of the picture is eliminated, and the picture B can be seen in an optical illusion that it is like a three-dimensional picture.

FIG. 7 is a sectional view of FIG. 6 along the line VII-VII. As shown in FIG. 7, one eye $E_1$ can look at the picture B as if it were three-dimensional because the eye $E_1$ cannot see the circumferential end area of the picture C but the other eye $E_2$ can look at the end area C of the picture and therefore the eye $E_2$ cannot look at the picture as if it is a three-dimensional picture. Similarly, D is a part of the picture B which cannot be viewed by the eye $E_2$ but can be viewed by eye $E_1$. Thus, this device is defective since it has position in which you cannot see the picture in three dimensions with the exception of the points E. Thus, for a viewer having two eyes, the circumferential frame A cannot be practically used for viewing the photographic picture or portrait as if it is a three-dimensional one.

Figure 8:
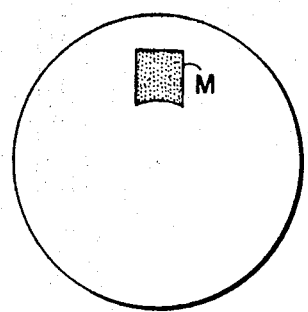

Still further, FIG. 8 illustrates of the defect of the visual power of a man. Referring to FIG. 8, a circular plate having a square mark M is shown. When the plate is in the state of repose, you can look the square mark having the width and the length. But, when the plate is rotated you cannot clearly recognize the width of the square mark, although revolution is very slow. This shows that the width of an article moving in the direction of its width cannot be recognized although its moving speed is very slow. Still further, this shows that the parallax of pictures does not contribute to the three-dimensional viewing effect for a moving picture. Parallax is due to recognizing the width of interval between one image and the other image on the retina of the right eye and left eye respectively. The width on the retina of the right eye is, in this case, the same as the width on the retina of left eye, and yet as above mentioned, we cannot recognize clearly the width in the case of a moving picture. Therefore, "the three-dimensional viewing system by parallax of a picture" as for example in "a lenticuller lens stereotype device" is unsuitable for a moving picture as TV, movies or the like.

Figure 9:
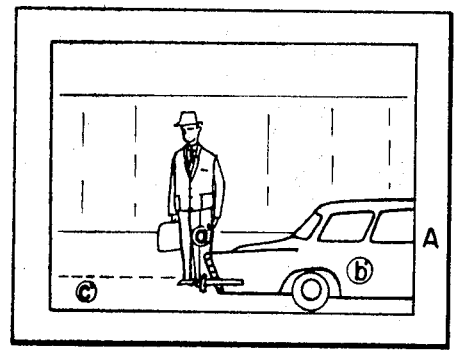

FIG. 9 shows a stereopicture taken by using a stereocamera. The picture has a circumferential white area on the surface of a single paper. The focus of the camera is adjusted to a man $a'$. The man and the end area A are viewed as if they are located at the same visual distance but a motor car $b'$, which was placed in front of the man $a'$ during photographing, is viewed as it is projected and cut down. This optical feeling is clearly different from the optical feeling of seeing the actual view, therefore, this fact shows that the stereopicture is affected by the action of the circumferential end area A and it cannot be viewed as it is a lifelike article existing in wide scene. Therefore, it is apparent that a stereotype device has some disadvantages.

The inventor has found a mechanism for making a projected optical illusion image of the circumferential end area of the photographic picture or portrait. The mechanism consists of a front pattern and a back pattern, together with the photographic picture or portrait. The patterns include various modification as listed below:

1. the flat patterns having a plurality of vertical or oblique line stripes which are painted on a transparent plate material in the form of solid or dotted colored lines. Examples of the transparent material are glass, plastic resins, cellophane, celluloid and the like. Also, the transparent materials may be replaced by the semitransparent materials such as a frosted glass, a milky white glass or milky white plastics, or the light reflecting materials such as paper, wood and metals or other light nontransmissive materials.
2. Blindlike or the netlike patterns having a plurality of vertical or oblique hole stripes which are formed by placing a plurality of ribbons at regular intervals. Such ribbons are made of plastic materials, metals or clothes.
3. wavelike patterns provided with a plurality of vertical or oblique wavelike stripes which are formed on a transparent plate material in the form of continuous waves periodically repeated on one side or both sides of a transparent plate material such as glass, plastic resin, celluloid or the like. The above-described modifications are generically called "optically striped patterns" since those are seen like stripes (by the difference of reflecting amount or refracting angle or transmitting amount of ray between each portion of it). Incidentally, it should be understood that the above vertical stripes and oblique stripes can be summarized in a point of having a vertical component.

Every pattern above mentioned is usable as a back pattern, and the flat line-striped pattern painted on a transparent plate or said blindlike or netlike pattern or said wavelike pattern is usable as a front pattern. The colored solid or dotted vertical or oblique line stripes or the vertical or oblique hole stripes or the wave stripes of the patterns are spaced at certain pitch or certain horizontal intervals. It is noted that the term "pitch" used herein indicates the perpendicular distance between the center lines of the vertical stripes and also that the term "horizontal interval" used herein indicates the horizontal distance between the center lines of the oblique stripes. And also, it is noted that the pitch or the horizontal interval of the front stripes of the front pattern is correlated with the pitch or the horizontal interval of the back stripes of the back pattern as defined by the following equation:

$P_2 =_1 + d \times P_1$ or $P_2 = n \times (P_1 + d \times P_1)$ $H_2 =_1 + d \times H_1$ or $H_2 = n \times (H_1 + d \times H_1)$ wherein $P_1$ indicates the pitch of the front stripes, $P_2$ indicates the pitch of the back stripes, $H_1$ indicates the horizontal interval of the front stripes, $H_2$ indicates the horizontal interval of the back stripes, d is a numerical value varying from $10^{16}$ to 1, but, in practical use, varying from $10^{15}$ to 0.4 and $n$ is a positive integer (2 to $10^5$). Either of the above pitch and the horizontal interval are generically called "horizontally measured pitch" and represented by "M" since these are the length horizontally measured between each centerline of adjacent stripes.

Figure 10:
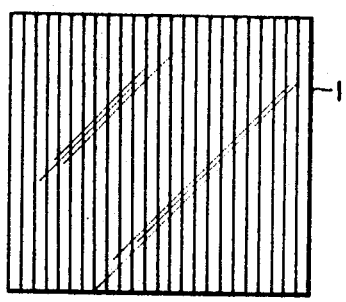

Referring to FIG. 10, it shows an example of the front flat pattern provided with a plurality of vertical line stripes having a pitch (from 0.01 mm. to 50 cm.) It is preferable that the numerical value of the pitch of said front stripes or said back stripes is selected from very small value on condition that each line of the stripes is unable to be recognized separately when it is observed at a distance which is suitable for viewing the picture of its device.

Figure 11:
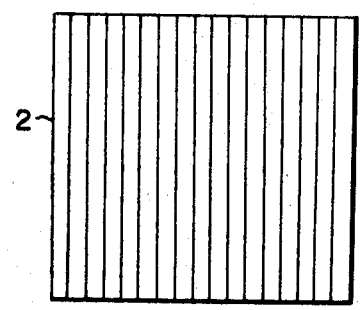
Figure 13:
Figure 14:
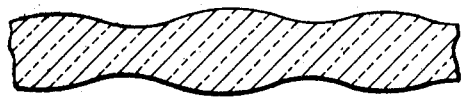
Figure 15:

Referring to FIG. 11, there is shown an example of the back flat pattern provided with a plurality of the vertical line stripes. FIGS. 13 and 14 are examples of the wavelike patterns having a plurality of wave stripes which are formed on both sides of a transparent plate material such as glass, plastic material or the like. Referring to FIG. 15, it is a modification of the wavelike pattern and it is provided with a plurality of wave stripes on one side of a transparent plate material.

Figure 12:
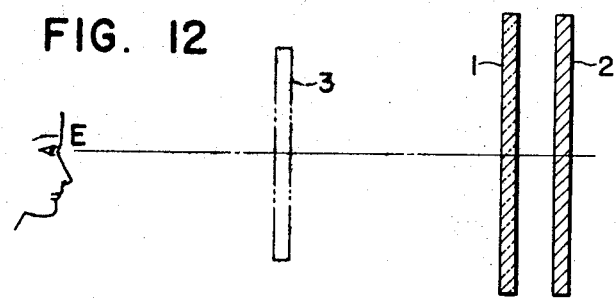
Figure 16:
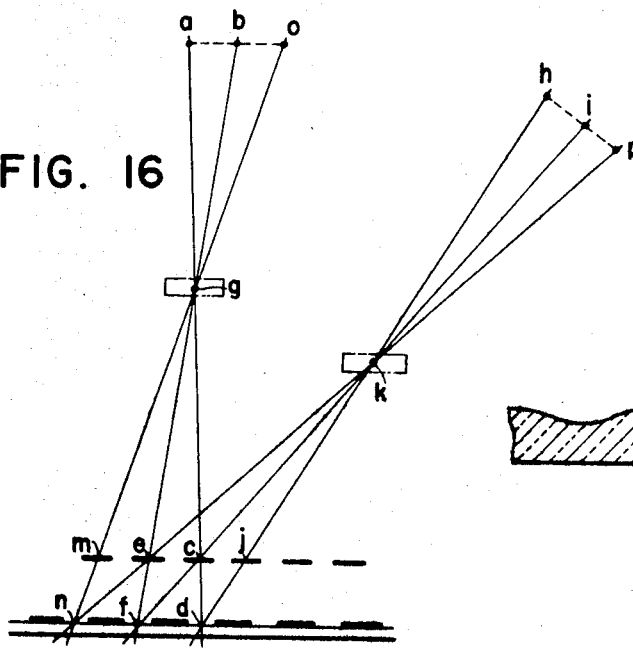

Now the mechanism used in this invention for making the projected optical illusion image of the circumferential or peripheral end area of a photographic picture or portrait is illustrated by FIG. 12 and 16. As shown in FIG. 12, the line-striped flat front pattern 1 as shown in FIG. 10 and the line-striped flat back pattern 2 as shown in FIG. 11 are placed in front of a man E. The man E looks at a projected optical illusion image 3 which is the interference pattern of the stripes of the front and back patterns. One can recognize the interfered stripes, although one cannot recognize the front stripes or the back stripes, because the pitch of the interfered stripes is larger than the pitch of the front stripes or the back stripes and varying from 10 times to 10,000 times. In FIG. 12, the front pattern 1 is placed in parallel to the back pattern 2 but it is understood that one of the two patterns may be inclined for producing a projected optical illusion image.

This phenomenon can be fully explained hereinafter by referring to FIG. 16. In FIG. 16, the letters $m, e, c$ and $j$ are the stripes disposed on the front pattern and the letters $n, f$ and $d$ are the stripes disposed on the back pattern. The visual points are indicated by the letters $a, b, o, h, i$ and $p$. When the front and back patterns are observed by the visual point $a$, the viewer can view an interfered dark stripe on the line $acd$, because, naturally you see the darkest point on the portion in which a dark front stripe covers a bright back stripe most completely. In the same manner by the visual point $b$, an interfered dark stripe can be viewed on the line $bef$. Also, an interfered dark stripe can be viewed on the line $omn$ by viewing the patterns at the visual point $o$.

Consequently, if points $a$ and $o$ represent a right and a left eye, respectively, a dark stripe of the interfered stripes is observed by right eye on $ac$ but not on $am$, and is observed by left eye on $om$ but not observed on $oc$, therefore it appears through illusion as if dark line of interfered stripes existed at a point $g$.

This is because the binocular parallax in this case is the same for the case there is an existing dark line at the point $g$. This is quite true of other interfered stripes. Thus the plane of the projecting illusion image is produced at the level included point $g$. In the same manner, an interfered stripe can be viewed as a projected optical illusion on the point $k$ when the front and back patterns are observed by the visual points $h$ and $p$ corresponding to the right and left eyes respectively. In the above case, it will be understood that any of the striped patterns can be printed on a transparent plate and the blindlike or netlike pattern may be used as the line-striped flat front pattern 1.

It is noted that the medium existing between the front and back patterns may be the transparent materials such as gases, liquids and solids. This is generically referred to as "the front pattern being optically spaced from the rear pattern." Therefore, it is understood that the pattern can be made of a single transparent material which carries the front stripes on the one side of plate and the back stripes on the other side of the plate.

This invention is illustrated by the following Examples.

Each stripe of the wavelike front stripes may function optically as a cylindrical lens, therefore a portion of the front stripe in the state of a convex cylindrical lens corresponds to the back stripes placed behind the front stripes, and a magnified image of the back dark stripe appears on the viewing line. Thus it will be understood that the point where the front pattern's portion corresponding to a convex cylindrical lens is aligned with the back pattern's dark stripe on the viewing line constitutes the darkest point of the interfered stripes. The darkest points appears at regular intervals, and thus interfered stripes are produced in this case. Therefore, of course, the theory for the flat stripes above-illustrated by FIG. 16 is the same way applied to wavelike stripes. As described above, the form of optically keeping the optical-striped pattern of a front stripe apart from the optical striped pattern of a rear stripe by one or two plates (at least, front plate is made of a transparent material in case of two plates) is called "optically spaced state."

EXAMPLE 1.

This example employs a display device which is provided with a vertical line striped flat front pattern as shown in FIG. 10 and a vertical line striped flat back pattern as shown in FIG. 11. Referring to FIG. 17, a front view of a two-dimensional picture 11 and a vertical line striped flat back flat is shown. FIG. 18 is a sectional view of FIG. 17 along the line XVIII–XVIII and FIG. 19 is a sectional view of FIG. 17 along the line XIX–XIX. In FIG. 17, the two-dimensional picture was painted on the surface of the single sheet or film and the back pattern was made on the surface of the same. The sheet or film may be a single paper when the picture is displayed by the reflecting light but the sheet or film may be a light-transmissive plate or a milky white light-transmissive plate when the picture is displayed by the transmissive light. In this example, the vertical line back stripes were painted on the light-reflective paper in the form of the colored solid lines painted in the from of extremely small pitch, on the upper and lower circumferential end areas A1 and A'1, and the side circumferential end areas B1 and B'1. The vertical line striped flat front pattern 13 is shown in FIGS. 18 and 19 and the numeral 12 indicates the support. It is preferred that the side circumferential end areas C1 and C'1 are painted in a black or a dark black color and also it is preferable that the black or dark color is faded into the white or bright color in the direction toward the picture. Further, it is preferable that the portion C1 and C'1 are not color painted all over the surface but painted with back stripes, and, in this case, it is preferable that the end portion of the picture is faded into the colorless or white color in the direction toward the end boundary of the picture.

Also, it is preferable that the upper and lower end areas A1 and A'1 are colored different from the color of the side circumferential end areas C1 and C'1. Still further, it will be noted that the vertical line striped flat front pattern 13 can be modified by eliminating the stripes which corresponds to the picture as shown in FIG. 17.

In this display device, it is preferable to use the front pattern provided with the vertical line stripes having a pitch varying from 0.01 mm. to 5 cm.

When viewing the device, one can recognize the interfered stripes which appears as a result of the back patterns of the circumferential end area interfered by the portion of the front stripes. Thus, as mentioned above, image of circumferential end areas A1, A'1, B1, b'1, C1, C'1 projects from the picture's level, and one can see said picture as if it is three-dimensional. The first reason is that one views naturally the three-dimensional illusion image as a result of it being a perspective picture, without suffering any interference by the picture edge effect, in consequence of the end edge effect being eliminated by the projecting illusion image from circumferential end area of said picture.

Further, the second reason is that one comes to feel, with consistency, that the imaginative depth-thickness of every article in said picture is included naturally in the imaginative space which behind the level of the circumferential end area of the picture. The meaning of the above mentioned "three-dimensional illusion from a perspective picture" is that one customarily recognizes near matter as big and distant matter as small, and therefore one feels a short distance from a big pictorial image of matter in the picture and feels a long distance from a small pictorial image of said same kind respectively.

EXAMPLE 2.

This example shows a device for displaying a picture on a screen. This device can be constructed by modifying the display device of example 1, the device as illustrated in FIGS. 17, 18 and 19. In FIG. 17, the two-dimensional picture is replaced with a screen, on which, a picture is projected by a light source placed behind the screen. The upper and lower circumferential end areas A1 and A'1 are constructed by a light-transmissive opaque material such as a frosted glass in the case of viewing the circumferential end areas by the light source placed in the behind of the screen, and said light source is different from the screen-projecting light source, but in the case of viewing the circumferential end areas by the reflected light from said end area, it is also suitable that the end area is made of light defused reflecting material such as a white sheet of paper.

The side circumferential end areas B1, B'1, C1 and C'1 are considered to be the end portions of the screen. The back stripes are painted in the form of the colored solid vertical lines on the end areas B1 and B'1. The line-striped flat front pattern 13 is provided with vertical line stripes having a pitch varying from 0.01 mm. to 5 cm. is placed on before the screen. A picture is projected on the screen by a projector, which is placed behind the screen, for displaying the picture as if it is a three-dimensional picture.

As illustrated in Example 1, it is preferable that the side circumferential end areas C1 and C'1 are painted in a dark color or a black color. Also, it is preferable that said end areas C1 and C'1 are faded into a dark or black color in the direction toward the interior of the end areas. Further, it is desirable that portions C1 and C'1 are not painted in black or dark color, but painted in the form of the back stripes. In this case, it is preferable that the side end of the projecting light is faded into darkness in the direction toward the outside of the projecting light bundle by a suitable filter placed in suitable position. Further it will be understood that this device may be applied to an eidophor system, a television receiver, and also an electric picture-board consisting with a plurality of dots of electroluminescent material or luminous electrosemiconductor material.

EXAMPLE 3.

This example comprises a television receiver provided with a line-striped flat front pattern as shown in FIG. 10 and a line-striped flat back pattern as shown in FIG. 11. FIG. 20 shows a front view of the television receiver provided with back stripes. FIG. 20 is a sectional view of FIG. 21 along the line XXI–XXI and FIG. 22 is a sectional view of FIG. 20 along the line XXII–XXII. In FIGS. 20, 21 and 22, there is provided an image-receiving tube 21, a frame plate 22, a line-striped flat front pattern 23, provided with the vertical or oblique line stripes having a pitch varying from 0.01 mm. to 2 cm. A support 24, the light sources 25 and 25', and the light-reflecting plates 26 and 26' are provided. The frame plates are made of a light-transmissive opaque material such as a frosted glass or a milky white glass or a light defused reflecting plate such as a paper, may be used. The line-striped back stripes are painted on the upper and lower end portions A2 and A'2 and lateral end portions B2, B'2, C2 and C'2 of said frame plate. It is also desirable that the lateral end portions C2 and C'2 are painted in a dark color or completely black color. Also, it is preferable that the end portions C2 and C'2 fade into the dark or black color in the direction toward the innerside of said end portions.

It will be understood that the front pattern 23 may be eliminated when the front stripes are painted on one side of all end portions of the frame plate and the back stripes are painted on the opposite side of all end portions of the frame plate. The frame plate can be separate or one of the frame plates can be connected with the other frame plate by a transparent material. The frame plate is transparent and is painted white over all of its surface except the area B2 and B'2. Thus, needless to say, the white colored area is opaque. And it is preferable that the white color on the area C2 fades into noncolor in the direction toward area B2 at the boundary between area C2 and area B2 and, in the manner, white color of area C'2 fades into noncolor in the direction toward area B'2 at the boundary between area C'2 and area B'2. Also, it is noted that the vertical or oblique line back stripes may be painted on the back surface of the image-receiving tube at the lateral end portions thereof. Further, it will be understood that the front pattern 23 can be replaced by a blindlike front pattern having a plurality of vertical or oblique hole stripes or by a wavelike front pattern having a plurality of wavelike stripes and the back pattern can be replaced by a wavelike back pattern. The frame plate as modified is a plate which is transparent at its central part approximately in front of the screen of the receiving-tube, and, at its circumferential end area, has front stripes on its front side surface and has said back stripes on its back side surface. It is preferred to eliminate interfered stripes between the front stripes and the dots of the picture, said interfered stripes having a bad effect on the picture on said screen. The front stripes having larger oblique angles varying from 10° to 45° with the vertical direction and back stripes having larger oblique angles than the front stripe in same oblique direction. Thus interfered stripes between the front stripes and dots of the picture are eliminated, and the interfered stripes between the front stripes and back stripes appear in the form of vertical stripes as before. The oblique angle of back stripes in this case is known easily by experiment or calculation.

Further the light source 25 and 25' may be eliminated when the device is viewed under bright light. In this case, the back pattern 22 may be made of a light defused-reflecting material. Still further, the light source 25 and 25' may be eliminated if the back pattern has an electroluminescent plate on its back surface. The back pattern 22 can be made flatly over all as indicated by two pointed dotted line in FIG. 21.

EXAMPLE 4

This example comprises a cinema screen provided with a line-striped flat front pattern as shown in FIG. 10 and a line-striped flat back pattern as shown in FIG. 11.

Figure 24:
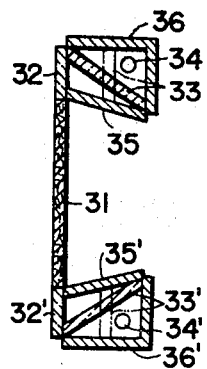

FIG. 23 shows a front view of the cinema screen, onto which a picture is projected by a light source placed before the screen. In such a case, a front pattern cannot be placed before the screen and therefore the front pattern must be placed at the same level as that of the screen. FIG. 24 is a sectional view of FIG. 23 along the line XXIV–XXIV. In FIGS. 23 and 24, the numeral 31 is the part of the screen, onto which a picture is projected. The upper and lower circumferential end areas 32 and 32' of the screen are made of a transparent material, on which the vertical or oblique line front stripes are painted. The numerals 33 and 33' are the light-transmissive opaque plate, on which the vertical or oblique line back stripes are painted. It is preferable that the lateral circumferential end areas of said screen are faded into a black color in the direction toward the outside of said screen. It will be understood that the front pattern can be replaced by a blindlike front pattern or by a wavelike front pattern. Light sources 34 and 34', light-intercepting plates 35 and 35', and light-reflecting plates 36 and 36' are provided.

It is, of course, understood that the light-transmissive opaque plates 33, 33' may be eliminated when the back stripes are painted on the opposite surface of the end areas 32 and 32' of a light-transmissive plate having front stripes.

It is preferable to use front stripes having a pitch varying from 0.01 mm. to 50 cm. Further, back pattern 33 can be made in the form of flat plate which is parallel to the screen as indicated by the two point dotted line in FIG. 24.

It is preferable that the device illustrated in Example 4 is applied to an oblong screen such as a Cinema-Scope screen.

EXAMPLE 5.

This example comprises a screen in accordance with this invention which is different from Example 4. It is provided with a line-striped flat front pattern as shown in FIG. 10 and a line-striped flat back pattern as shown in FIG. 11.

Figure 25:
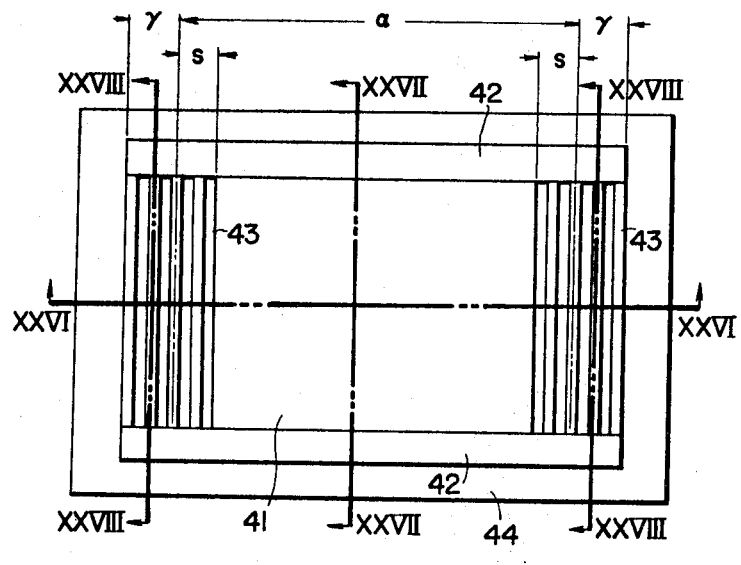
Figure 26:
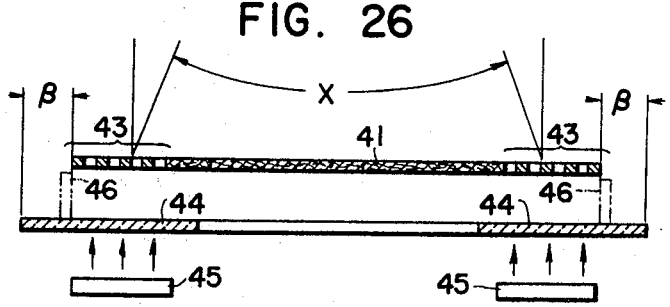
Figure 27:
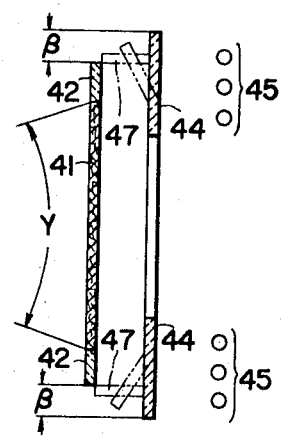
Figure 28:
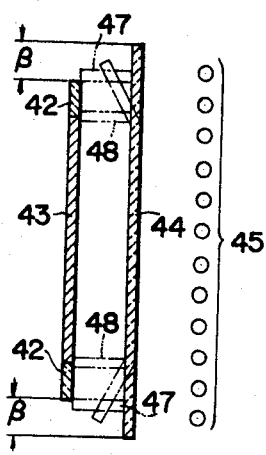

FIG. 25 is a front view of the screen and FIG. 26 is a cross-sectional view of FIG. 25 cut taken along lines XXVI–XXVI, FIG. 27 is a sectional view of FIG. 25 cut taken along the line XXVII–XXVII and FIG. 28 is a sectional view of FIG. 25 cut taken along lines XXVIII–XXVIII.

FIG. 25 to 28 show screen 41 and the upper or the lower light-transmissive plates 42. The vertical line front stripes (not shown) are painted on the upper or lower transparent plate in a black color. A blindlike or the netlike front pattern 43 and a back pattern 44 is provided by a plurality of vertical line stripes which are painted on the light-transmissive opaque plate. The back pattern 44 may be bent forwardly at the upper or lower end portions. Light sources 45 are provided, but can be eliminated when an electroluminescent plate is placed onto the back surface of the back pattern 44. Also, the light sources 45 can be placed before the back pattern 44 when the front surface of said back pattern 44 is coated with an irregularly light-reflecting material. Further, light sources 45 can be eliminated when a daylight screen is used. The sign X of FIG. 26 and the sign Y of FIG. 27 indicate the projection angle of the light. In FIG. 25, the area $\alpha$, which is enclosed by the dotted line, indicates the reflection area of the projected light.

Again referring to FIGS. 24 and 26, the blindlike front pattern 43 corresponds to an area ($s$) and an area ($\gamma$) as shown in FIG. 25. The area ($s$) is constructed by black ribbons coated with a silver white paint on their surfaces to produce the irregular reflecting light. The area ($\gamma$) is constructed by the black ribbons having no light-reflection and no light-transmissibility. The black color tone of the ribbons is faded at the boundary between said black colored area and said white colored area ($s$) in the direction from the area ($\gamma$) to the area ($s$). It is noted that the blindlike front pattern (43) can replace the vertical line-striped front pattern, which is made of a light-transmissive plate, provided with the vertical line stripes which are painted by a silver white paint or a black paint. Also, the vertical line front stripes disposed on the upper and lower light-transmissive plate 42 can be replaced by a blindlike front pattern or a wavelike front pattern.

It is preferable to use the front stripes having a pitch ranging from 0.01 mm. to 4 cm.

When one looks at the above mentioned system diagonally, the back pattern 44 must be larger than the front pattern, and therefore the back pattern 44 must be extended by the area $\beta$ at the both ends thereof. But the area $\beta$ can be eliminated from the back pattern 44 by placing the mirrors, as indicated by numerals 46, 47 and 48 in FIG. 26, FIG. 27, and FIG. 28, perpendicularly to said back pattern. It will be understood that the upper and lower light-transmissive plates 42 can be used as the front and back patterns by painting the front stripes on the one surface of the plate and painting the back stripes on the opposite surface of the plate.

The above-mentioned device is preferably applied to ordinary type moving picture screen or the eidophor system screen.

It will be understood that in accordance with the provisions of the patent statutes, variations and modifications of the devices herein disclosed may be made without departing from the spirit of the invention.

What I claim is:

1. A system for displaying a two-dimensional picture in a manner to produce the illusion that the picture has three dimensions comprising:
   first surface means having a two-dimensional picture displayed thereon,
   means defining first and second, front and rear, striped patterns extending outwardly from at least one edge of said picture and adjacent thereto with said patterns overlapped in spaced planes, the rear second striped pattern being viewed through the gaps between the stripes of the first front pattern, and the relationship between the horizontally measured pitch of said first front and second rear patterns is given by the formula $M_2 = (M_1 d \times M_1) \times n$, wherein; $M_2$ is the measured horizontal pitch of the optical stripes of the second rear pattern, $M_1$ is measured horizontal pitch of the optical stripes of the first front pattern, $d$ is a numerical value between $10^{16}$ and 0.4, and $n$ is a positive integer of from 1 to 10, whereby; an optical interference between the striped patterns gives the illusion that the area adjacent to at least one edge of said picture is in a plane differing from the plane of the picture.

2. The system as claimed in claim 1, wherein the means for displaying said two dimensional picture comprises a television receiver and said first surface means comprises an image receiving tube of said television receiver.

3. The system as claimed in claim 1, wherein said means defining front and rear, first and second, striped patterns are the surfaces respectively of a transparent material plate positioned adjacent to the border of said displayed picture, said transparent plate carrying wavelike stripes at least on its front surface.

4. The system as claimed in claim 1, wherein the angle between a vertical line and the stripes of said first front pattern ranges between 10° and 45° and the angle between a vertical line and the stripes of said second rear pattern is greater than the above-mentioned angle in the same direction.

5. The system as claimed in claim 2, in which the lateral end portions of said image receiving tube comprises said second rear striped pattern.

6. The system as claimed in claim 2, wherein the side end portions of the surfaces of the image-receiving tube screen is such that it fades to nontransparent color in the direction toward the outer edge of the screen.

7. The system as claimed in claim 2, where the first front striped pattern comprises a transparent plate positioned in front of said image receiving tube, said transparent plate carrying wavelike stripes, and said second, rear striped pattern comprises a rear plate carrying stripes.

8. The system as claimed in claim 7, wherein said first front transparent plate is devoid of wavelike stripes on that portion which corresponds to the surface of said image receiving tube.

9. The system as claimed in claim 7, wherein said wavelike striped pattern on the first front transparent plate is replaced by a blindlike or netlike pattern.

10. The system as claimed in claim 1, wherein the means for displaying said two-dimensional picture upon said first surface is a projector, said first surface is a screen, said projector projects its image upon said screen from the direction opposite that of the viewer and said first front striped pattern adopts a wavelike form.

11. The system as claimed in claim 3, wherein said wavelike pattern comprises a painted color pattern.

12. The system as claimed in claim 1, further including means for phasing the edge portions of the picture carried by said first surface means into darkness in a direction toward the outside of said first surface means, said phasing means including a light projected on the surface means area adjacent said edge and a suitable filter positioned between said projecting light source and said first surface means.

13. The system as claimed in claim 1, wherein said first surface means is a screen and the means for displaying said two-dimensional picture upon the screen is a projector which projects that picture from the side of the screen facing the viewer.

14. The system as claimed in claim 13, wherein the edge portions of said screen fade into darkness by painting a color on the screen which darkens in a direction towards the outside of said screen.

15. The system as claimed in claim 13, wherein said first front pattern is a blindlike or netlike pattern set in the same plane as said screen and said second rear striped pattern is carried by a rearwardly offset plate on the side of the screen opposite the viewers.

16. The system as claimed in claim 1 further including mirrors positioned between and generally perpendicular to first front and second rear striped patterns.

17. The system as claimed in claim 2, wherein the first front striped pattern comprises a transparent plate positioned in front of said image-receiving tube, said transparent plate carries a color painted striped pattern on a surface thereof overlying said image receiving tube and said second, rear striped pattern comprises a rear plate carrying stripes.

18. The system as claimed in claim 15, wherein; the darker color of said blindlike or netlike front pattern fades into a lighter color in a direction toward the line of intersection between said screen and the circumferential lateral end areas of said front pattern.

19. The system as claimed in claim 2, wherein the angle between a vertical line and the stripes of said first front pattern ranges between 10° and 45° and the angle between a vertical line and the stripes of said second rear pattern is greater than the above-mentioned angle in the same direction.

20. The system as claimed in claim 7, wherein the angle between a vertical line and the stripes of said first front pattern ranges between 10° and 45° and the angle between a vertical line and the stripes of said second rear pattern is greater than the above mentioned angles in the same direction.

UNITED STATES PATENT OFFICE
CERTIFICATE OF CORRECTION

Patent No. 3,582,961  Dated  June 1, 1971

Inventor(s) Chushiro Shindo

It is certified that error appears in the above-identified patent and that said Letters Patent are hereby corrected as shown below:

In the Abstract, line 6, after "cinema screen" insert ---- , ----
In the Abstract, line 8, before "photographic picture" insert
---- circumferential end area ----

Column 3, line 3 change [a' edge A] to ---- a' = edge A ----

Column 4, line 46, change [$P_2 = 1 + dxP_1$] to ---- $P_2 = P_1 + dxP_1$ ----

Column 4, line 47, change [$H_2 = 1 + dxH_1$] to ---- $H_2 = H_1 + dxH_1$ ----

Column 4, line 51, change [$10^{16}$] to ---- $10^{-6}$ ----

Column 4, line 52, change [$10^{15}$] to ---- $10^{-5}$ ----

Column 5, line 69, after "Fig. 16 is" insert --- in ---

Column 6, line 7, [flat back flat] to ---- flat back pattern ----.

Column 9, line 18, change [Fig. 24] to ---- Fig. 25 ----

Column 9, line 69, change $M_2 = (M_1 d \times M_1) \times n$] to --- $M_2 = (M_1 + dxM_1) \times n$ --

Column 9, line 73, change [$10^{16}$] to ---- $10^{-6}$ ----

Column 10, line 67, change [Claim 1] to ---- Claim 15 ----.

Signed and sealed this 9th day of Mey 1972.

(SEAL)
Attest:

EDWARD M.FLETCHER,JR.
Attesting Officer

ROBERT GOTTSCHALK
Commissioner of Patents

UNITED STATES PATENT OFFICE
CERTIFICATE OF CORRECTION

Patent No. 3,582,961          Dated    June 1, 1971

Inventor(s)   Chushiro Shindo

It is certified that error appears in the above-identified patent and that said Letters Patent are hereby corrected as shown below:

Column 7, line 40, change [Fig. 20] to ---- Fig. 21 ---- and change [Fig. 21] to ---- Fig. 20 ----.

Signed and sealed this 3rd day of October 1972.

(SEAL)
Attest:

EDWARD M. FLETCHER, JR.                ROBERT GOTTSCHALK
Attesting Officer                       Commissioner of Patents